United States Patent
Yang et al.

(10) Patent No.: US 10,107,942 B2
(45) Date of Patent: Oct. 23, 2018

(54) ANTI-REFLECTIVE FILM HAVING SUPERB OPTICAL CHARACTERISTICS

(71) Applicant: LG Hausys, Ltd., Seoul (KR)

(72) Inventors: Ji-Yeon Yang, Seoul (KR); Hong-Kwan Cho, Anyang-si (KR); Jin-Ki Hong, Seoul (KR); Won-Kook Kim, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 473 days.

(21) Appl. No.: 14/443,993

(22) PCT Filed: Oct. 14, 2013

(86) PCT No.: PCT/KR2013/009124
§ 371 (c)(1),
(2) Date: May 19, 2015

(87) PCT Pub. No.: WO2014/081120
PCT Pub. Date: May 30, 2014

(65) Prior Publication Data
US 2015/0323706 A1    Nov. 12, 2015

(30) Foreign Application Priority Data

Nov. 21, 2012 (KR) .................. 10-2012-0132543

(51) Int. Cl.
*G02B 1/10* (2015.01)
*G02B 1/111* (2015.01)
(Continued)

(52) U.S. Cl.
CPC ............ *G02B 1/111* (2013.01); *C08J 5/18* (2013.01); *C08J 7/047* (2013.01); *C09D 183/08* (2013.01);
(Continued)

(58) Field of Classification Search
CPC ....... C08J 5/18; C08J 7/04; C08J 7/042; C08J 7/047; C08J 2367/02; C08J 2383/04;
(Continued)

(56) References Cited

U.S. PATENT DOCUMENTS

2007/0266896 A1* 11/2007 Suwa .................. C09D 5/006
106/287.16
2009/0230835 A1* 9/2009 Tsuchimoto ............ G02B 1/11
313/112

FOREIGN PATENT DOCUMENTS

JP    2001-235604 A    8/2001
JP    2002-317152 A    10/2002
(Continued)

OTHER PUBLICATIONS

International Search Report for PCT/KR2013/009124 dated Jan. 6, 2014, citing the above reference(s).
(Continued)

*Primary Examiner* — Stephone B Allen
*Assistant Examiner* — Jyotsna Dabbi
(74) *Attorney, Agent, or Firm* — Hauptman Ham, LLP

(57) ABSTRACT

An anti-reflective film having a stacked structure including a transparent substrate, a high refraction layer and a low refraction layer, and more specifically, the low refraction layer may include, as a binder, a siloxane compound synthesized by reacting alkoxysilane and organosilane having a fluoroalkyl group.

9 Claims, 1 Drawing Sheet

(51) Int. Cl.
  *C08J 5/18* (2006.01)
  *G02B 1/11* (2015.01)
  *C08J 7/04* (2006.01)
  *C09D 183/08* (2006.01)
  *C08G 77/24* (2006.01)
(52) U.S. Cl.
  CPC ............... *G02B 1/11* (2013.01); *C08G 77/24* (2013.01); *C08J 2367/02* (2013.01); *C08J 2383/06* (2013.01); *C08J 2483/08* (2013.01)
(58) Field of Classification Search
  CPC . C08J 2383/06; C08J 2483/04; C09D 183/04; C09D 183/08; C08G 77/04; C08G 77/22; C08G 77/24; B32B 27/00–27/42; B29D 7/01; B29D 11/0073; B29C 47/0038; B31F 1/07; G02B 5/285; G02B 5/28; G02B 5/0294; G02B 5/0278; G02B 5/045; G02B 6/29358; G02B 1/11; G02B 1/111; G02B 1/118; G02B 1/115; G02B 1/116; G02B 1/12; G02B 1/14; G02B 1/16; G02B 1/10; G02B 1/105; G02F 1/133502; G02F 2202/022; G02F 2202/023; G02F 2202/16; G02F 2202/22
  USPC ....... 359/577, 580, 581, 585, 586, 588, 589, 359/601; 428/156, 174
  See application file for complete search history.

(56) References Cited

FOREIGN PATENT DOCUMENTS

| | | |
|---|---|---|
| JP | 2003-057415 A | 2/2003 |
| JP | 2003-202406 A | 7/2003 |
| JP | 2004-258267 A | 9/2004 |
| JP | 2005-201986 A | 7/2005 |
| JP | 2006-106715 A | 4/2006 |
| JP | 2008-058348 A | 3/2008 |
| JP | 2010-085579 A | 4/2010 |
| JP | 2010-167744 A | 8/2010 |
| JP | 2010-0217873 A | 9/2010 |
| JP | 2011-107618 A | 6/2011 |
| KR | 10-2005-0065345 A | 6/2005 |
| KR | 7018756 B1 * | 3/2008 ............... G02B 1/11 |
| KR | 10-2009-0060265 A | 6/2009 |
| KR | 10-2009-0119968 A | 11/2009 |
| WO | 2006/051835 A1 | 5/2006 |
| WO | 2008/126528 A1 | 10/2008 |

OTHER PUBLICATIONS

Taiwanese Office Action for corresponding Taiwanese Patent Application No. 102139371 dated Nov. 22, 2016, citing the above reference(s).

Japanese Office Action dated Sep. 5, 2017, from JPO in connection with the counterpart Japanese Patent Application No. 2015-543956, citing the above reference(s).

Japanese Office Action dated Jun. 5, 2018, issued in corresponding Japanese Patent Application No. 2015-543956, citing the above reference.

* cited by examiner

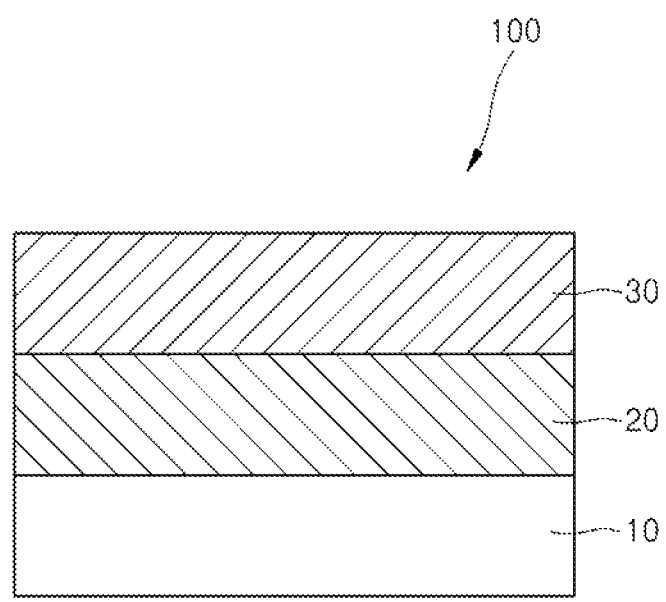

ANTI-REFLECTIVE FILM HAVING SUPERB OPTICAL CHARACTERISTICS

TECHNICAL FIELD

The present invention relates to an anti-reflective film having excellent optical properties.

BACKGROUND ART

When a display is exposed to external light such as various illumination and natural light, an image formed inside the display is not clearly focused on an eye, thereby causing deterioration in contrast of the display. Due to such deterioration in contrast, a person has a difficulty in viewing a screen and suffers from eye fatigue or a headache. For this reason, there is a strong demand for anti-reflection.

As the need for anti-reflection has been emphasized, in an effort to find a film structure capable of providing anti-reflection in the visible range, an anti-reflective film including a high refractive-index layer and a low refractive-index layer repeatedly stacked one above another has been developed, and continuous studies have been made to reduce the number of layers. Such an anti-reflective film has been developed in the form of a stack structure in which a low refractive-index layer is formed on a high refractive-index layer. In addition, it has been found that anti-reflection effects increase with increasing difference in index of refraction between the low refractive-index layer and the high refractive-index layer. However, it is still challenging to design an anti-reflective film including a low refractive-index layer and a high refractive-index layer.

DISCLOSURE

Technical Problem

It is an aspect of the present invention to provide an anti-reflective film which provides excellent anti-reflection using a high refractive-index layer and a low refractive-index layer while exhibiting improved adhesion and optical properties.

Technical Solution

In accordance with one aspect of the present invention, an anti-reflective film has a stack structure of a transparent substrate, a high refractive-index layer, and a low refractive-index layer, wherein the low refractive-index layer includes: a binder formed by polymerization of a silane compound represented by Formula 1 with an organosilane compound represented by Formula 2; and hollow silica particles.

[Formula 1]

where $R^1$ is a $C_1$ to $C_{10}$ alkyl group, a $C_6$ to $C_{10}$ aryl group, or a $C_3$ to $C_{10}$ alkenyl group; $R^2$ is a $C_1$ to $C_6$ alkyl group; and x is an integer satisfying $0 \leq x < 4$.

[Formula 2]

where $R^3$ is a $C_1$ to $C_{12}$ fluoroalkyl group; $R^4$ is a $C_1$ to $C_6$ alkyl group; and y is an integer satisfying $0 \leq y < 4$.

The silane compound represented by Formula 1 may include at least one compound selected from the group consisting of tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, diphenyldiethoxysilane, and combinations thereof.

The organosilane compound represented by Formula 2 may include at least one compound selected from the group consisting of trifluoromethyltrimethoxysilane, trifluoromethyltriethoxysilane, trifluoropropyltrimethoxysilane, trifluoropropyltriethoxysilane, nonafluorobutylethyltrimethoxysilane, nonafluorobutylethyltriethoxysilane, nonafluorohexyltrimethoxysilane, nonafluorohexyltriethoxysilane, tridecafluorooctyltrimethoxysilane, tridecafluorooctyltriethoxysilane, heptadecafluorodecyltrimethoxysilane, heptadecafluorodecyltriethoxysilane, and combinations thereof.

The hollow silica particles may have a number average diameter of about 1 nm to about 1,000 nm.

The binder may be present in an amount of about 10 parts by weight to about 120 parts by weight based on 100 parts by weight of the hollow silica particles.

The low refractive-index layer may have an index of refraction of about 1.2 to about 1.25.

The low refractive-index layer may have a thickness of about 50 nm to about 150 nm.

The high refractive-index layer may have an index of refraction of about 1.6 to about 1.7.

The high refractive-index layer may have a thickness of about 100 nm to about 500 nm.

The anti-reflective film may have a water contact angle of about 70° or less.

The anti-reflective film may have a reflectance of less than about 0.5% as measured at a wavelength of about 450 nm to about 650 nm.

The anti-reflective film may have a color value a* of $-1 < a^* < 2$ and a color value b* of $-1 < b^* < 1$ for reflected light upon irradiation with white light.

Advantageous Effects

The anti-reflective film can exhibit excellent adhesion strength and good optical properties.

In addition, the anti-reflective film can be applied to various displays, such as touch films, by virtue of excellent anti-reflection effects thereof.

DESCRIPTION OF DRAWINGS

FIG. 1 is a schematic sectional view of an anti-reflective film according to one embodiment of the present invention.

BEST MODE

Hereinafter, embodiments of the present invention will be described in detail. However, it should be understood that the present invention is not limited to the following embodiments and should be defined only by the accompanying claims and equivalents thereof.

In accordance with one embodiment of the present invention, an anti-reflective film has a stack structure of a transparent substrate, a high refractive-index layer, and a low refractive-index layer, wherein the low refractive-index layer includes: a binder formed by polymerization of a silane compound represented by Formula 1 with an organosilane compound represented by Formula 2; and hollow silica particles.

$$R^1_x Si(OR^2)_{4-x} \quad \text{[Formula 1]}$$

where $R^1$ is a $C_1$ to $C_{10}$ alkyl group, a $C_6$ to $C_{10}$ aryl group, or a $C_3$ to $C_{10}$ alkenyl group; $R^2$ is a $C_1$ to $C_6$ alkyl group; and x is an integer satisfying $0 \le x < 4$.

$$R^3_y Si(OR^4)_{4-y} \quad \text{[Formula 2]}$$

where $R^3$ is a $C_1$ to $C_{12}$ fluoroalkyl group; $R^4$ is a $C_1$ to $C_6$ alkyl group; and y is an integer satisfying $0 \le y < 4$.

Generally, anti-reflection effects increase with increasing difference in index of refraction between the low refractive-index layer and the high refractive-index layer. Thus, continuous studies have been made to develop low refractive-index coating materials having a very low index of refraction through development of hollow silica particles. However, the index of refraction of low refractive-index coating materials prepared using typical acrylic resins dose not reach the range of about 1.22 to about 1.24, in which anti-reflection can be optimally realized in principle.

However, when a coating solution including, as a binder, a siloxane compound prepared by reacting a fluoroalkyl group-containing organosilane with alkoxysilane, is used for the low refractive-index layer, the anti-reflective film can realize high transmittance and low reflectance while exhibiting improved optical properties through optical design between the low refractive-index layer and the high refractive-index layer.

The silane compound represented by Formula 1 may be a tetrafunctional alkoxy silane having four alkoxy groups when x is 0; a trifunctional alkoxy silane having three alkoxy groups when x is 1; and a bifunctional alkoxy silane having two alkoxy groups when x is 2. The silane compound represented by Formula 1 when x is 3 is not advantageous in condensation with the organosilane compound represented by Formula 2, since the silane compound has only one alkoxy functional group.

In Formula 1, the $C_6$ to $C_{10}$ aryl group may include a phenyl group, a tolyl group and the like, and the $C_3$ to $C_{10}$ alkenyl group may include an allyl group, a 1-propenyl group, a 1-butenyl group, a 2-butenyl group, a 3-butenyl group and the like.

The silane compound may include at least one compound selected from the group consisting of tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, diphenyldiethoxysilane, and combinations thereof, without being limited thereto.

The organosilane compound represented by Formula 2 may include at least one compound selected from the group consisting of trifluoromethyltrimethoxysilane, trifluoromethyltriethoxysilane, trifluoropropyltrimethoxysilane, trifluoropropyltriethoxysilane, nonafluorobutylethyltrimethoxysilane, nonafluorobutylethyltriethoxysilane, nonafluorohexyltrimethoxysilane, nonafluorohexyltriethoxysilane, tridecafluorooctyltrimethoxysilane, tridecafluorooctyltriethoxysilane, heptadecafluorodecyltrimethoxysilane, heptadecafluorodecyltriethoxysilane, and combinations thereof, without being limited thereto. In addition, it is advantageous that $R^3$ be a $C_3$ to $C_5$ fluoroalkyl group in terms of prevention of phase separation.

A siloxane compound is prepared by hydrolysis and dehydration condensation polymerization of the silane compound represented by Formula 1 and the organosilane compound represented by Formula 2. In hydrolysis and dehydration condensation polymerization, an acid catalyst may be used. Specifically, nitric acid, hydrochloric acid, sulfuric acid, acetic acid or the like may be used.

In polymerization, the organosilane compound represented by Formula 2 is added in an amount of about 0.1 parts by weight to about 50 parts by weight, preferably about 1 part by weight to about 30 parts by weight, more preferably about 5 parts by weight to about 20 parts by weight, based on 100 parts by weight of the silane compound represented by Formula 1. If the amount of the organosilane compound is less than about 0.1 parts by weight, there are problems in that a formed coating layer provides insignificant reduction in index of refraction, whereas if the amount of the organosilane compound is greater than about 50 parts by weight, there are problems in that the coating layer can have an increased index of refraction.

The siloxane compound acts as an organic-inorganic hybrid binder and thus serves to treat a surface of the hollow silica particles.

The siloxane compound has a weight average molecular weight of about 1,000 to about 100,000, preferably about 2,000 to about 50,000, more preferably about 5,000 to about 20,000. If the weight average molecular weight is less than about 1,000, it is difficult to form a coating layer having a desired low index of refraction, whereas if the weight average molecular weight is greater than about 100,000, there is a problem of deterioration in light transmittance of an anti-reflective film.

The hollow silica particles refer to silica particles which are derived from a silicon compound or an organic silicon compound and have an empty space on the surface thereof and/or therein.

The hollow silica particles may be dispersed in a dispersion medium (water or organic solvent) to form a colloid having a solid content of about 5% by weight (wt %) to about 40 wt %. Here, an organic solvent capable of being used as the dispersion medium may include: alcohols such as methanol, isopropyl alcohol (IPA), ethylene glycol, butanol, and the like; ketones such as methyl ethyl ketone, methyl isobutyl ketone (MIBK), and the like; aromatic hydrocarbons such as toluene, xylene, and the like; amides such as dimethyl formamide, dimethyl acetamide, N-methyl pyrrolidone, and the like; esters such as ethyl acetate, butyl acetate, γ-butyrolactone, and the like; ethers such as tetrahydrofuran, 1,4-dioxane, and the like; and mixtures thereof. However, when a colloid solution in which the hollow silica particles are dispersed in a dispersion medium is used, as described above, it is desirable that the amount of the hollow silica be adjusted within the range as set forth above in consideration of solid content and the like.

In addition, it is advantageous in maintenance of transparency of a film and in exhibition of anti-reflection thereof that the hollow silica particles have a number average diameter of about 1 nm to about 1,000 nm, specifically about 5 nm to about 500 nm, more specifically about 10 nm to about 100 nm.

The binder of the siloxane compound is present in an amount of about 10 parts by weight to about 120 parts by weight, preferably about 20 parts by weight to about 100 parts by weight, more preferably about 40 parts by weight to about 80 parts by weight, based on 100 parts by weight of the hollow silica particles. If the amount of the binder is less than about 10 parts by weight, there is a problem of whitening of a coating surface, and if the amount of the binder is greater than about 120 parts by weight, there is a problem of significant deterioration in anti-reflection of the coating layer.

The anti-reflective coating composition may include an acid catalyst to promote surface treatment of the hollow silica particles with the binder, and the acid catalyst may be any acid catalyst generally used in the art without limitation. Preferably, the acid catalyst is nitric acid or hydrochloric acid. The acid catalyst may be present in an amount of about 0.1 parts by weight to about 20 parts by weight based on 100 parts by weight of the hollow silica particles. In preparation of the anti-reflective coating composition, it is advantageous that the coating composition be adjusted to have a pH of about 2 to about 4 using the acid catalyst.

Referring to FIG. 1, an anti-reflective film 100 may include a transparent substrate 10, a high refractive-index layer 20, and a low refractive-index layer 30.

The transparent substrate 10 may include various substrates, such as transparent polymer resins and the like, used for typical liquid crystal displays and the like. Specifically, the substrate may include polyethylene terephthalate (PET), polyethylene naphthalate (PEN), polyethersulfone (PES), polycarbonate (PC), polypropylene (PP), norbornene resins, and the like.

When material of the substrate is PET, a PET film may have a thickness of about 10 μm to about 200 μm, specifically about 20 μm to about 100 μm. If the thickness of the transparent substrate is less than about 10 μm, the substrate has a problem in terms of mechanical strength, and if the thickness of the transparent substrate is greater than about 200 μm, there is a possibility that the substrate does not exhibit improved touch properties as a substrate for touch panels.

The high refractive-index layer 20 may have a thickness of about 100 nm to about 500 nm, specifically about 150 nm to 450 nm. Within this range, the high refractive-index layer can easily provide improved reflectance and visibility to the anti-reflective film, while minimizing cracking and curling due to increase in stress. Moreover, an anti-reflective film having optimized properties in terms of luminous reflectance in relation with the low refractive-index layer can be provided.

The high refractive-index layer 20 may have an index of refraction of about 1.6 to 1.7. Within this range, it is possible to improve optical properties of the anti-reflective film in that the greater the difference in index of refraction between the high refractive-index layer and the low refractive-index layer, the higher the anti-reflection of the anti-reflective film.

The low refractive-index layer 30 may have a thickness of about 50 nm to about 150 nm. Within this range, the low refractive-index layer can provide improved anti-reflection to the anti-reflective film, while maintaining excellent adhesion. In addition, the low refractive-index layer 30 may have an index of refraction of about 1.2 to about 1.5. Within this range, the low refractive-index layer can provide improved optical properties to the anti-reflective film due to a large difference in index of refraction between the high refractive-index layer and the low refractive-index layer.

As used herein, reflection means a phenomenon that, when light traveling through a certain medium reaches an interface with another medium, all or part of the light is sent back into the original medium. When light reflection occurs, transmitted light intensity decreases as much as reflected light intensity, which can cause unstable luminous output. An anti-reflective film may refer to a film for preventing such reflection.

Thus, an anti-reflective film is required to ensure predefined optical properties. For example, an anti-reflective film needs to have low reflectance and must not cause any variation on a colorimeter during light transmission. The anti-reflective film 100 as set forth above is sequentially formed, for example, above a PET film, with the high refractive-index layer having an index of refraction of about 1.62 to about 1.70 and a thickness of about 200 nm to about 450 nm and the low refractive-index layer having an index of refraction of about 1.22 to about 1.25 and a thickness of about 90 nm to about 130 nm, thereby exhibiting optimized reflectance and optical properties.

The anti-reflective film may have a water contact angle of about 70° or less. When water is placed on a horizontal surface of a solid material, a water droplet retaining a lens shape can be formed. Here, the water droplet has a curved surface, which forms an angle with the surface of the solid material. When a value of the angle is measured at an inner side of the water droplet, the value is referred to as a contact angle. Specifically, as used herein, the contact angle refers to an angle formed between the anti-reflective film and the surface of water.

An anti-reflective film having a water contact angle of about 70° or less has an advantage in terms of high surface adhesion. Although the anti-reflective film does not have a lower limit for a water contact angle thereof, the anti-reflective film may specifically have a water contact angle of about 40° to about 70°.

The anti-reflective film may have a reflectance of less than about 0.5%, as measured at a wavelength of about 450 nm to about 650 nm. This wavelength range of about 450 nm to about 650 nm is within the visible range, and the anti-reflective film can have desired optical properties, i.e. a reflectance of less than about 0.5% through optical design intended to adjust the index of refraction and thickness of the high refractive-index layer and the index of refraction and thickness of the low refractive-index layer to the range set forth above.

As used herein, the reflectance refers to a percentage of reflective light energy to incident light energy. Thus, the reflected energy decreases with decreasing reflectance of the anti-reflective film, thereby reducing negative effects caused by light reflection. Accordingly, when reflectance of the anti-reflective film is maintained at less than about 0.5%, the anti-reflective film can exhibit sufficient anti-reflection function and can prevent reflected light from having a blue or red tone by virtue of low reflectance thereof. In addition, there is an advantage in that reflected light has a flat reflectance spectrum and a neutral color value.

The anti-reflective film may have a color value a* of $-1<a*<2$ and a color value b* of $-1<b*<1$ for reflected light upon irradiation with white light. When the anti-reflective film is irradiated with white light in accordance with a CIE standard colorimetric system established by the Commission International de L'eclairage (CIE, International Commission on Illumination), the color value of reflected light may be represented by CIE L*, a*, and b* which are defined such that a distance between two colors in a color space corresponds to a difference in color observed with the naked eye, based on a CIE 10° standard observer (CIE 1964). Here, L*, a*, and b* represent brightness, a value between Red and Green, and a value between Yellow and Blue, respectively. Thus, the color values upon irradiation with white light (D65) at a wavelength of about 380 nm to about 780 nm may be represented by a* and b* values, respectively.

It can be said that a lower absolute value of the color value indicates a smaller change in color difference caused by light. Here, the color difference refers to a perceptual difference between two colors and may be measured in terms of both reflective color difference and transmissive color difference using a colorimeter.

The anti-reflective film has a stack structure of the transparent substrate, the high refractive-index layer, and the low refractive-index layer and is designed by adjustment of the thickness and index of refraction of the respective layers, whereby the absolute value of the color value for reflected light can be maintained in a predetermined range. Within the ranges of the color value a* and the color value b* as set for above, the anti-reflective film does not appear blue or red, but can exhibit a neutral color.

Specifically, the indexes of refraction of the high refractive-index layer and the low refractive-index layer are identified using a prism coupler and a PET film is provided as the substrate, followed by simulating the respective layer using an optical design tool, whereby the structure, thickness, and the like of each layer constituting the anti-reflective film may be inferred, assuming that the anti-reflective film exhibits a reflectance of less than about 0.5% and has color values for reflected light satisfying $-1<a*<2$ and $-1<b*<1$.

Accordingly, when a PET film is sequentially coated with a high refractive-index layer having a thickness of about 200 nm to about 450 nm and a low refractive-index layer having a thickness of about 50 nm to about 150 nm through such a simulation, it is possible to design an anti-reflective film exhibiting a reflectance of less than about 0.5% and having color values for reflected light satisfying $-1<a*<2$ and $-1<b*<1$.

Hereinafter, the present invention will be described in more detail with reference to some examples. It should be understood that these examples are provided for illustration only and are not to be construed in any way as limiting the present invention

PREPARATIVE EXAMPLE

Preparative Example 1-1: Preparation of Siloxane Compound Binder 100 parts by weight of water, 433 parts by weight of isopropanol (IPA), and 36 parts by weight of 0.1 M $HNO_3$ were placed in a reactor, followed by stirring for 10 minutes. Next, 372 parts by weight of tetraethoxysilane (tetraethyl orthosilicate, TEOS) and 29 parts by weight of (3,3,3-trifluoropropyl)triethoxysilane were slowly introduced into the reactor through a funnel for 30 minutes. Next, the components were stirred at 50° C. for 2 hours, followed by cooling to room temperature, and then stirred again at a speed of 200 rpm for 24 hours, thereby obtaining a transparent binder solution. It was confirmed that the solution had a solid content of 13 wt % and a pH of 2.2. The transparent solution was used in manufacture of a coating composition in the following stage without a separate purification process.

Preparative Example 1-2: Preparation of Siloxane Compound Binder

A binder solution was prepared in the same manner as in Preparative Example 1-1 except that (3,3,3-trifluoropropyl) triethoxysilane was not introduced.

Preparative Example 2-1: Preparation of Anti-Reflective Coating Composition for Low Refractive-Index Layer 65 parts by weight of the binder solution prepared in Preparative Example 1-1, 100 parts by weight of isopropanol, and 65 parts by weight of a hollow silica particle-isopropanol dispersion sol (Thrylya 4110, JGC C&C Co., Ltd., 20% w/w) having a number average diameter of 60 nm were placed in a reactor, followed by stirring at room temperature for 24 hours, thereby preparing an anti-reflective coating composition. It was confirmed that the prepared anti-reflective coating composition for a low refractive-index layer had a solid content of 10 wt % and a pH of 2.5.

Preparative Example 2-2: Preparation of Anti-Reflective Coating Composition for Low Refractive-Index Layer An anti-reflective coating composition for a low refractive-index layer was prepared in the same manner as in Preparative Example 2-1 except that the binder solution prepared in Preparative Example 1-2 was used.

EXAMPLES AND COMPARATIVE EXAMPLE

Example 1

An anti-reflective film was embodied using an optical design software tool. A high refractive-index layer having an index of refraction of 1.64 was formed on a PET film, followed by forming a low refractive-index layer having an index of refraction of 1.24 on the high refractive-index layer. Here, the low refractive-index layer was formed by coating the anti-reflective coating composition for a low refractive-index layer prepared in Preparative Example 2-1, and the index of refraction of the low refractive-index layer was measured using a prism coupler.

Examples 2 to 9

An anti-reflective film was embodied in the same manner as in Example 1 except that the thicknesses of a high refractive-index layer and a low refractive-index layer were changed.

Comparative Example

An anti-reflective film was embodied using an optical design software tool.

A high refractive-index layer having an index of refraction of 1.64 was formed on a PET film, followed by forming a low refractive-index layer having an index of refraction of 1.26 on the high refractive-index layer. Here, the low refractive-index layer was formed by coating the anti-reflective coating composition for a low refractive-index layer prepared in Preparative Example 2-2, and the index of refraction of the low refractive-index layer was measured using a prism coupler.

Experimental Example

For each of the anti-reflective films in Examples and Comparative Example, transmittance was measured using a CM-5 spectrophotometer (Konica Minolta Co., Ltd.). In addition, a back surface of each of the anti-reflective films was subjected to blackening treatment, followed by measurement of luminous reflectance. Moreover, CIE L*, a*, and b* values, specifically, transmissive a*, transmissive b*, reflective a*, and reflective b* values according to the structure of each of the anti-reflective films in Examples and Comparative Example were measured under the following conditions: white light (D65) and a CIE 1964 observer. Results are shown in Table 1.

$$R^1_x Si(OR^2)_{4-x} \quad \text{[Formula 1]}$$

where $R^1$ is a $C_1$ to $C_{10}$ alkyl group, a $C_6$ to $C_{10}$ aryl group, or a $C_3$ to $C_{10}$ alkenyl group; $R^2$ is a $C_1$ to $C_6$ alkyl group; and x is an integer satisfying 0≤x<4, $$R^3_y Si(OR^4)_{4-y} \quad \text{[Formula 2]}$$

TABLE 1

| | High refractive-index layer | | Low refractive-index layer | | Transmittance (%) | Reflectance (%) | CIE lab | | |
|---|---|---|---|---|---|---|---|---|---|
| | Thickness (nm) | Index of refraction | Thickness (nm) | Index of refraction | | | | | |
| Example 1 | 150 | 1.64 | 90 | 1.24 | 99.59 | 0.31 | T | a* | −0.1804 |
| | | | | | | | | b* | 0.0868 |
| | | | | | | | R | a* | 1.56 |
| | | | | | | | | b* | −0.85 |
| Example 2 | 150 | 1.64 | 100 | 1.24 | 99.81 | 0.08 | T | a* | −0.1780 |
| | | | | | | | | b* | 0.0809 |
| | | | | | | | R | a* | 1.97 |
| | | | | | | | | b* | −0.97 |
| Example 3 | 170 | 1.64 | 100 | 1.24 | 99.73 | 0.15 | T | a* | −0.0764 |
| | | | | | | | | b* | 0.3719 |
| | | | | | | | R | a* | 1.45 |
| | | | | | | | | b* | −0.9710 |
| Example 4 | 170 | 1.64 | 110 | 1.24 | 99.44 | 0.45 | T | a* | −0.0839 |
| | | | | | | | | b* | 0.1270 |
| | | | | | | | R | a* | 1.3410 |
| | | | | | | | | b* | −0.8967 |
| Example 5 | 250 | 1.64 | 110 | 1.24 | 99.42 | 0.40 | T | a* | −0.2475 |
| | | | | | | | | b* | 0.6241 |
| | | | | | | | R | a* | 1.8838 |
| | | | | | | | | b* | −0.9978 |
| Example 6 | 300 | 1.64 | 110 | 1.24 | 99.61 | 0.18 | T | a* | −0.4006 |
| | | | | | | | | b* | 0.8695 |
| | | | | | | | R | a* | 1.45 |
| | | | | | | | | b* | −0.97 |
| Example 7 | 350 | 1.64 | 100 | 1.24 | 99.64 | 0.12 | T | a* | −0.3179 |
| | | | | | | | | b* | 0.9672 |
| | | | | | | | R | a* | 1.9253 |
| | | | | | | | | b* | −0.9866 |
| Example 8 | 400 | 1.64 | 110 | 1.24 | 99.40 | 0.33 | T | a* | −0.1476 |
| | | | | | | | | b* | 0.0768 |
| | | | | | | | R | a* | 1.9021 |
| | | | | | | | | b* | −0.9154 |
| Example 9 | 450 | 1.64 | 110 | 1.24 | 99.41 | 0.29 | T | a* | −0.4168 |
| | | | | | | | | b* | 0.5191 |
| | | | | | | | R | a* | 1.8915 |
| | | | | | | | | b* | −0.9673 |
| Comparative Example 1 | 300 | 1.64 | 100 | 1.26 | 97.66 | 1.28 | T | a* | −0.2465 |
| | | | | | | | | b* | 1.2322 |
| | | | | | | | R | a* | 3.2751 |
| | | | | | | | | b* | −6.7582 |

T represnts "transmissive" and R represents "refecltive".

In Table 1, it was ascertained that the anti-reflective films of Examples had a transmittance of 99% or higher, a reflectance of 0.5% or less, and excellent anti-reflection properties. In addition, the anti-reflective films of Examples had a color value a* of −1 to 2 and a color value b* of −1 to 1 for reflected light. Thus, it could be seen that the anti-reflective films of Examples had an insignificant color difference caused by reflected light and exhibited excellent anti-reflection properties.

The invention claimed is:
1. An anti-reflective film having a stack structure of a transparent substrate, a high refractive-index layer, and a low refractive-index layer, wherein the low refractive-index layer comprises: a binder formed by polymerization of a silane compound represented by Formula 1 with an organosilane compound represented by Formula 2; and hollow silica particles, where $R^3$ is a $C_1$ to $C_{12}$ fluoroalkyl group; $R^4$ is a $C_1$ to $C_6$ alkyl group; and y is an integer satisfying 0≤y<4,
wherein the anti-reflective film has a water contact angle of about 40° to about 70°,
wherein the anti-reflective film has a reflectance ranging from about 0.08% to about 0.45%, and
wherein the anti-reflective film reflects light having color value of a* and b* in CIE L*a*b* color space of 1.3410≤a*≤1.97 and −0.9978≤b*≤−0.85, respectively, when irradiated with white light.
2. The anti-reflective film according to claim 1, wherein the silane compound represented by Formula 1 comprises at least one compound selected from the group consisting of tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, diphenyldiethoxysilane, and combinations thereof.

3. The anti-reflective film according to claim 1, wherein the organosilane compound represented by Formula 2 comprises at least one compound selected from the group consisting of trifluoromethyltrimethoxysilane, trifluoromethyltriethoxysilane, trifluoropropyltrimethoxysilane, trifluoropropyltriethoxysilane, nonafluorobutylethyltrimethoxysilane, nonafluorobutylethyltriethoxysilane, nonafluorohexyltrimethoxysilane, nonafluorohexyltriethoxysilane, tridecafluorooctyltrimethoxysilane, tridecafluorooctyltriethoxysilane, heptadecafluorodecyltrimethoxysilane, heptadecafluorodecyltriethoxysilane, and combinations thereof.

4. The anti-reflective film according to claim 1, wherein the hollow silica particles have a number average diameter of 1 nm to 1,000 nm.

5. The anti-reflective film according to claim 1, wherein the binder is present in an amount of 10 parts by weight to 120 parts by weight based on 100 parts by weight of the hollow silica particles.

6. The anti-reflective film according to claim 1, wherein the low refractive-index layer has an index of refraction of 1.2 to 1.25.

7. The anti-reflective film according to claim 1, wherein the low refractive-index layer has a thickness of 50 nm to 150 nm.

8. The anti-reflective film according to claim 1, wherein the high refractive-index layer has an index of refraction of 1.6 to 1.7.

9. The anti-reflective film according to claim 1, wherein the high refractive-index layer has a thickness of 100 nm to 500 nm.

* * * * *